United States Patent
Choi et al.

(10) Patent No.: US 11,170,201 B2
(45) Date of Patent: Nov. 9, 2021

(54) METHOD AND APPARATUS FOR RECOGNIZING OBJECT

(71) Applicant: Samsung Electronics Co., Ltd., Suwon-si (KR)

(72) Inventors: In-kwon Choi, Seongnam-si (KR); Gun-hee Lee, Anyang-si (KR); Hyun-joo Jung, Seoul (KR); Sung-jin Kim, Yongin-si (KR); Hyun-soo Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/635,024

(22) PCT Filed: Jul. 11, 2018

(86) PCT No.: PCT/KR2018/007829
§ 371 (c)(1),
(2) Date: Jan. 29, 2020

(87) PCT Pub. No.: WO2019/059505
PCT Pub. Date: Mar. 28, 2019

(65) Prior Publication Data
US 2020/0160034 A1    May 21, 2020

(30) Foreign Application Priority Data
Sep. 22, 2017   (KR) .................... 10-2017-0122876

(51) Int. Cl.
*G06K 9/00*        (2006.01)
*G06N 20/00*       (2019.01)
*G06K 9/62*        (2006.01)

(52) U.S. Cl.
CPC ....... *G06K 9/00208* (2013.01); *G06K 9/6203* (2013.01); *G06K 9/6289* (2013.01); *G06N 20/00* (2019.01)

(58) Field of Classification Search
USPC ......................................... 382/181
See application file for complete search history.

(56) References Cited

U.S. PATENT DOCUMENTS 8,553,989 B1   10/2013   Owechko et al.
9,633,282 B2    4/2017   Sharma et al.
(Continued)

FOREIGN PATENT DOCUMENTS

KR   10-2016-0034814 A   3/2016
KR      10-1657495 B1    9/2016
(Continued)

OTHER PUBLICATIONS

On et al.; Higher-Order Deep Neural Networks for Learning Multi-Modal Representations; Department of Computer Science and Engineering, Seoul National University; Dec. 2016; Seoul, KR.
(Continued)

*Primary Examiner* — Suhail Khan
(74) *Attorney, Agent, or Firm* — Jefferson IP Law, LLP

(57) ABSTRACT

Provided are an artificial intelligence (AI) system that simulates functions of a human brain such as recognition and judgment by utilizing a machine learning algorithm such as deep learning, etc., and an application of the AI system. Provided are an AI system and a method of recognizing an object according to the application of the AI system, the method including: obtaining a plurality of pieces of sensor data about the object from a plurality of different types of sensors; converting at least some of the plurality of pieces of sensor data into two-dimensional (2D) sensor data; and recognizing the object by using a previously generated
(Continued)

learning network model based on 2D image data obtained from an image sensor, which is one of the plurality of sensors, and the 2D sensor data.

15 Claims, 15 Drawing Sheets

(56) References Cited

U.S. PATENT DOCUMENTS

| | | | |
|---|---|---|---|
| 10,133,938 B2 | 11/2018 | Kim et al. | |
| 2002/0031276 A1* | 3/2002 | Yagishita | H04N 1/417 |
| | | | 382/252 |
| 2005/0232512 A1 | 10/2005 | Luk et al. | |
| 2006/0034505 A1* | 2/2006 | Luk-Pat | G06T 5/20 |
| | | | 382/144 |
| 2017/0032222 A1* | 2/2017 | Sharma | G06K 9/4619 |
| 2018/0189979 A1* | 7/2018 | Lin | G06K 9/4671 |
| 2019/0392253 A1 | 12/2019 | Ji et al. | |

FOREIGN PATENT DOCUMENTS

| | | |
|---|---|---|
| KR | 10-2016-0141152 A | 12/2016 |
| KR | 10-2017-0034226 A | 3/2017 |
| WO | 2009/070069 A1 | 6/2009 |

OTHER PUBLICATIONS

International Search Report with Written Opinion and English translation dated Oct. 23, 2018; International Appln. No. PCT/KR2018/007829.
Thomanek et al.; Comparing Visual Data Fusion Techniques using FIR and Visible Light Sensors to Improve Pedestrian Detection; 2011 International Conference on Digital Image Computing: Techniques and Applications; IEEE Computer Society; XP 55073900A; 2011.
European Search Report dated Jun. 29, 2020; European Appln. No. 18859460.0-1207 / 3648006 PCT/KR2018007829.

* cited by examiner

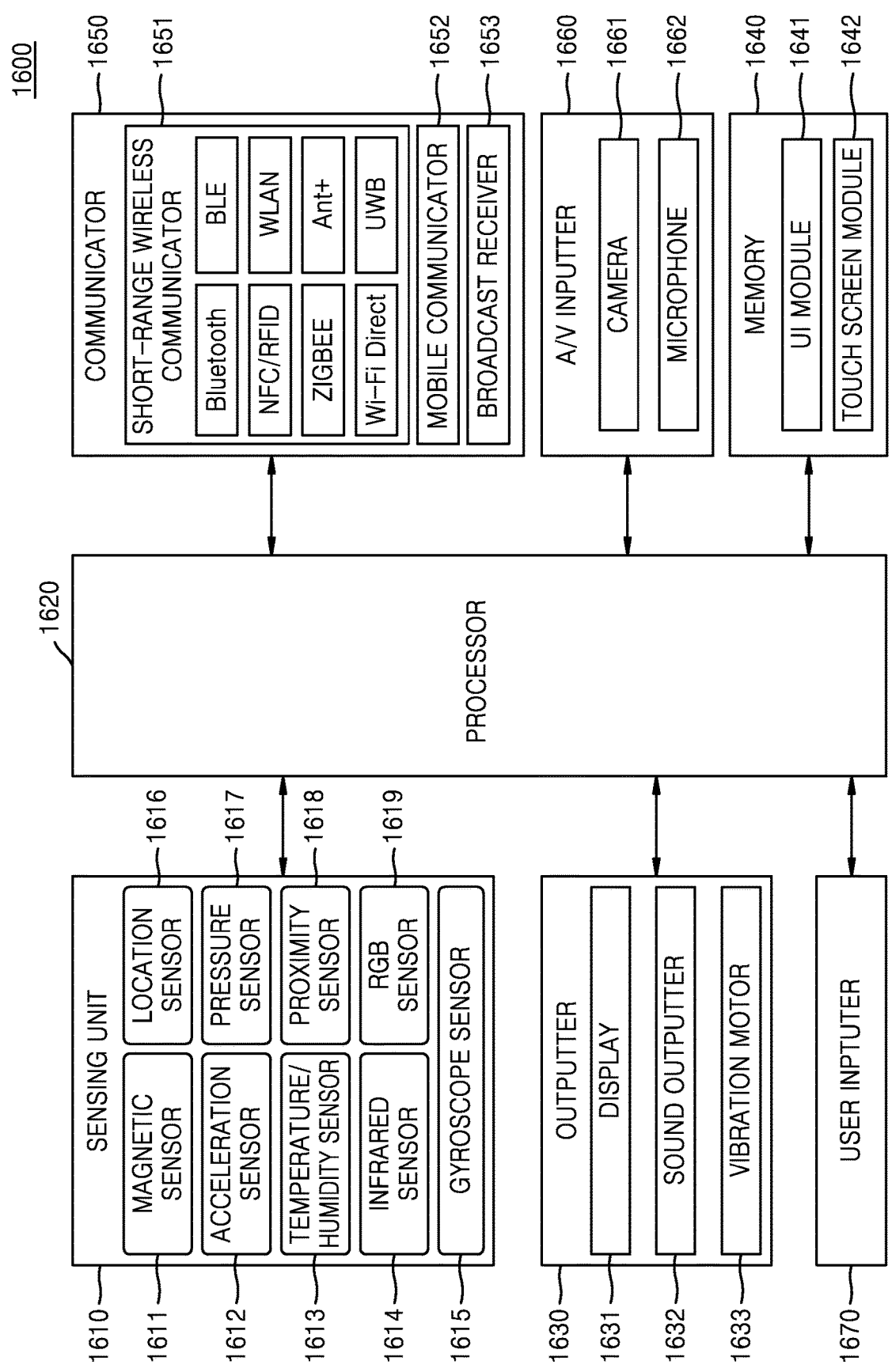

METHOD AND APPARATUS FOR RECOGNIZING OBJECT

TECHNICAL FIELD

Embodiments relate to an object recognition method, an object recognition apparatus, and a recording medium having recorded thereon a program for performing the object recognition method.

BACKGROUND ART

An artificial intelligence (AI) system is a computer system with human level intelligence. Unlike an existing rule-based smart system, the AI system is a system that trains itself autonomously, makes decisions, and becomes increasingly smarter. The more the AI system is used, the more the recognition rate of the AI system may improve and the AI system may more accurately understand a user preference, and thus, an existing rule-based smart system is being gradually replaced by a deep learning based AI system.

AI technology refers to machine learning (deep learning) and element technologies that utilize the machine learning.

Machine learning is an algorithm technology that classifies/learns the features of input data autonomously. Element technology is a technology that utilizes a machine learning algorithm such as deep learning and consists of technical fields such as linguistic understanding, visual comprehension, reasoning/prediction, knowledge representation, and motion control.

AI technology is applied to various fields as follows. Linguistic understanding is a technology to identify and apply/process human language/characters and includes natural language processing, machine translation, dialogue systems, query response, speech recognition/synthesis, and the like. Visual comprehension is a technology to recognize and process objects like human vision and includes object recognition, object tracking, image search, human recognition, scene understanding, spatial understanding, image enhancement, and the like. Reasoning prediction is a technology to acquire and logically infer and predict information and includes knowledge/probability based reasoning, optimization prediction, preference based planning, recommendation, and the like. Knowledge representation is a technology to automate human experience information into knowledge data and includes knowledge building (data generation/classification), knowledge management (data utilization), and the like. Motion control is a technology to control autonomous traveling of a vehicle and motion of a robot, and includes motion control (navigation, collision avoidance, and traveling), operation control (behavior control), and the like.

DESCRIPTION OF EMBODIMENTS

Technical Problem

Provided are a method, apparatus, and a recording medium for recognizing an object by combining sensor data of an object obtained using a plurality of different types of sensors, thereby increasing the accuracy of object recognition.

Solution to Problem

The disclosure relates to an artificial intelligence (AI) system and a method of recognizing an object according to an application of the AI system, the method including: obtaining a plurality of pieces of sensor data about the object from a plurality of different types of sensors; converting at least some of the plurality of pieces of sensor data into two-dimensional (2D) sensor data; and recognizing the object by using a previously generated learning network model, based on 2D image data obtained from one image sensor among the plurality of sensors and the 2D sensor data.

BRIEF DESCRIPTION OF DRAWINGS

FIG. 16 is a block diagram of an object recognition apparatus according to another embodiment.

BEST MODE

Figure 1:
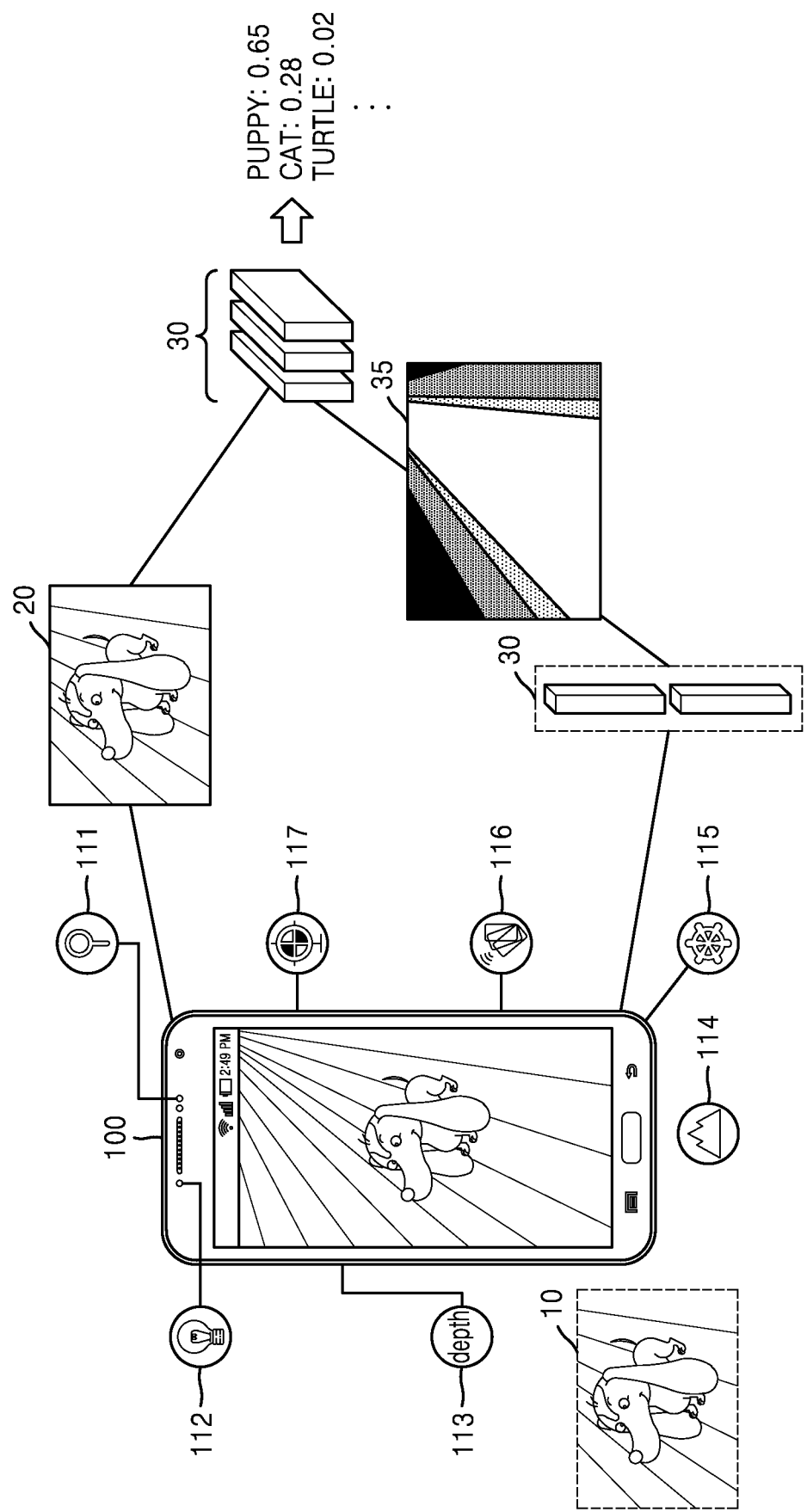
FIG. 1 is a conceptual diagram for explaining an object recognition method performed by an object recognition apparatus, according to an embodiment.

According to an embodiment of the disclosure, a method of recognizing an object includes obtaining a plurality of pieces of sensor data about the object from a plurality of different types of sensors; converting at least some of the plurality of pieces of sensor data into two-dimensional (2D) sensor data; and recognizing the object by using a previously generated learning network model based on 2D image data obtained from an image sensor which is one of the plurality of sensors and the 2D sensor data.

The plurality of sensors may include two or more sensors of a motion sensor, an image sensor, a proximity sensor, and a pressure sensor.

The converting may include converting the at least some of the plurality of pieces of sensor data into the 2D sensor data by using a learning network model, for conversion of sensor data, which is generated as a result of learning a reference for converting one-dimensional (1D) sensor data into the 2D sensor data.

The method may further include obtaining the 1D sensor data by reconverting the 2D sensor data; determining an error having occurred in the conversion of the sensor data based on a result of comparing 1D sensor data which is at least part of the obtained plurality of pieces of sensor data and the 1D sensor data obtained as a result of the reconversion; and based on the determined error, updating a parameter of a plurality of layers constituting the learning network model for the conversion of the sensor data.

The method may further include determining an error having occurred in the object recognition based on a result of comparing a category of the recognized object with a category of the object; and updating parameters of a plurality of layers constituting the previously generated learning network model based on the determined error.

The converting may include obtaining 1D sensor data in a first axial direction from at least one of the plurality of sensors; and generating the 2D sensor data by upsampling the 1D sensor data in the first axial direction in a second axial direction.

The recognizing of the object may include combining the 2D sensor data and the 2D image data by applying a preset weight to the 2D sensor data, and the preset weight may be a parameter of a plurality of layers constituting a learning network model generated for the conversion of the 2D sensor data, and may be updated based on an error of a recognition result obtained as a result of comparing a category of the recognized object and an actual category of the object.

The recognizing of the object may include obtaining image property information representing the object from the 2D image data by using a learning network model generated as a result of learning a reference for obtaining the image feature information from at least one piece of image data; and recognizing the object by using the previously generated learning network model based on the image feature information and the 2D sensor data.

The previously generated learning network model may include a plurality of layers, and a parameter of each of the plurality of layers may be determined based on a result of learning a reference for selecting at least one piece of data used for object recognition from among the image data and the 2D sensor data and combining the selected at least one piece of data.

The method may further include determining an error having occurred in the object recognition based on a result of comparing a category of the recognized object with a category of the object; and updating parameters of a plurality of layers constituting the previously generated learning network model based on the determined error.

According to another embodiment of the disclosure, an apparatus for recognizing an object includes a memory storing one or more instructions; a display; a plurality of sensors configured to obtain a plurality of pieces of sensor data about the object; and a processor configured to execute the one or more instructions stored in the memory to obtain the plurality of pieces of sensor data about the object from the plurality of sensors, convert at least some of the plurality of sensor data into two-dimensional (2D) sensor data; and recognize the object by using a previously generated learning network model based on 2D image data obtained from an image sensor which is one of the plurality of sensors and the 2D sensor data.

MODE OF DISCLOSURE

Terms used herein will be described in brief, and the disclosure will be described in detail.

Although terms used in the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

As used herein, terms including ordinals such as 'first' or 'second' may be used to describe various elements, but the elements should not be limited by the terms. The terms are only used for the purpose of distinguishing one element from another. For example, without departing the scope of the disclosure, a first element may be referred to as a second element, and similarly, a second element may be referred to as a first element. As used herein, the term "and/or" includes any and all combinations of one or more of the associated listed items.

Throughout the specification, when a portion "includes" an element, unless otherwise described, another element may be further included, rather than the presence of other elements being excluded. The term "unit" used herein may refer to software or hardware such as field programmable gate array (FPGA) or application specific integrated circuit (ASIC), and the "unit" may perform some functions. However, the "unit" may be not limited to software or hardware. The "unit" may be configured to exist in an addressable storage medium or may be configured to reproduce one or more processors. Therefore, as an example, "units" may include various elements such as software elements, object-oriented software elements, class elements, and task elements, processes, functions, attributes, procedures, subroutines, program code segments, drivers, firmware, microcodes, circuits, data, databases, data structures, tables, arrays, and variables. Functions provided in "units" and elements may be combined into a smaller number of "units" and elements or may be divided into additional "units" and elements.

Embodiments of the disclosure will be described in detail in order to fully convey the scope of the disclosure and enable one of ordinary skill in the art to embody and practice the disclosure. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

FIG. 1 is a conceptual diagram for explaining an object recognition method performed by an object recognition apparatus 100, according to an embodiment.

Referring to FIG. 1, the object recognition apparatus 100 may include a plurality of sensors 111 to 117. Here, the plurality of sensors 111 to 117 may include a proximity sensor 111, an image sensor 112, a depth sensor 113, a pressure sensor 114, a magnetic sensor 115, an acceleration sensor 116, and a gyro sensor 117.

The proximity sensor 111 may obtain location data of an object located around the object recognition apparatus 100 by using infrared rays or the like. The image sensor 112 may obtain image data of the object located around the object recognition apparatus 100. In addition, the depth sensor 113 may obtain sensor data about a distance between the object recognition apparatus 100 and the object, and the pressure sensor 114 may obtain sensor data about a pressure applied to the object recognition apparatus 100. The magnetic sensor 115 may obtain sensor data about the orientation by detecting the magnetic field strength in a third axis, and the acceleration sensor 116 may obtain sensor data about the movement of the object recognition device 110. The gyro sensor 117 may obtain sensor data about the inclination of the object recognition apparatus 100 by detecting the rotation state of the object recognition apparatus 100 in the third axis.

The object recognition apparatus 100 may combine the sensor data obtained from at least two or more sensors among the plurality of sensors 111 to 117 so as to increase the accuracy of object recognition. For example, the object recognition apparatus 100 may recognize an object 10 by combining two-dimensional (2D) image data 20 obtained from the image sensor 112 and sensor data 30 obtained from a motion sensor such as the acceleration sensor 116 and the gyro sensor 117.

The image data 20 obtained from the image sensor 112 may be 2D image data, whereas the sensor data 30 obtained from the motion sensor may be one-dimensional (1D) sensor data. Accordingly, the object recognition apparatus 100 may convert the 1D sensor data 30 obtained from the motion sensor into 2D sensor data 35. For example, the object recognition apparatus 100 may convert the 1D sensor data 30 into the 2D sensor data 35 by using a previously generated learning network for converting the sensor data 30. According to another example, the object recognition apparatus 100 may obtain the 2D sensor data 35 by upsampling the 1D sensor data 30 of a first axial direction in a second axis.

In addition, the object recognition apparatus 100 according to an embodiment may combine the image data 20 and the converted sensor data 35. For example, the object recognition apparatus 100 may recognize the object 10 based on the image data 20 and the converted sensor data 35 by using a previously generated learning network model 40 as a result of training based on a plurality of pieces of sensor data for object recognition.

Meanwhile, the object recognition apparatus 100 may recognize the object 10 by combining image feature information obtained from the image data 20 and the converted sensor data 35 using the previously generated learning network model 40 as a result of training to extract the image feature information. Here, the image feature information obtained from the image data 20 may be obtained through the learning network model 40 based on attribute information constituting the image data 20 such as color, edge, polygon, saturation, brightness, color temperature, blur, sharpness, contrast, etc.

The object recognition apparatus 100 according to an embodiment may output the recognition result of the object 10 as a probability value based on a result of combining the image data 20 and the converted sensor data 35. The object recognition apparatus 100 may recognize that the object 10 is a puppy based on the output probability value.

Meanwhile, the object recognition apparatus 100 may be a smartphone, a tablet PC, a PC, a smart TV, a mobile phone, a personal digital assistant (PDA), a laptop, a media player, a micro server, an electronic book object recognition apparatus, a kiosk, an MP3 player, a digital camera, a robot vacuum cleaner, home appliances, or other mobile or non-mobile computing devices, but is not limited thereto. In addition, the object recognition apparatus 100 may be a wearable device such as a watch, glasses, a hair band, and a ring having a communication function and a data processing function.

Figure 2:
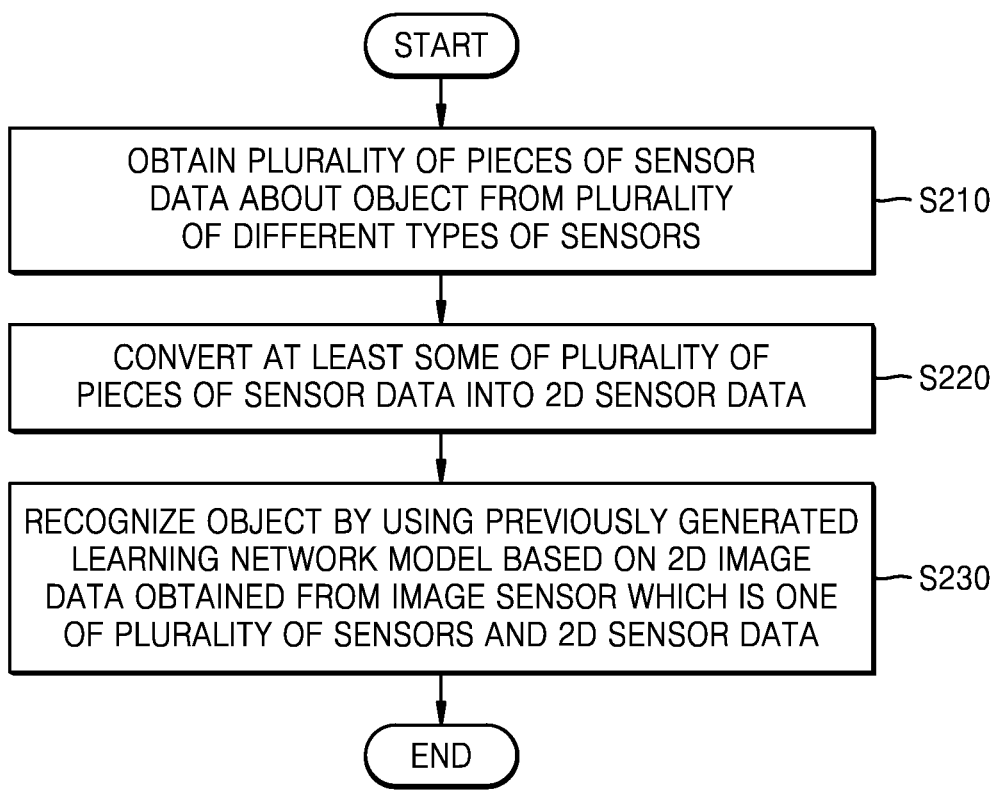
FIG. 2 is a flowchart of an object recognition method, according to an embodiment.

FIG. 2 is a flowchart of an object recognition method, according to an embodiment.

In operation S210, an object recognition apparatus may obtain a plurality of pieces of sensor data about an object from a plurality of different types of sensors.

The object recognition apparatus may obtain the plurality of pieces of sensor data about the object using at least two or more different types of motion sensors such as an image sensor, a depth sensor, a pressure sensor, a magnetic sensor, a proximity sensor, an acceleration sensor, a gyro sensor, etc. The above-described types of sensors are merely an embodiment, and the sensors included in the object recognition apparatus are not limited to the above-described examples.

In operation S220, the object recognition apparatus may convert at least some of the plurality of pieces of sensor data into 2D sensor data.

The object recognition apparatus according to an embodiment may combine 2D image data obtained from the image sensor and sensor data obtained from a different type of sensor so as to increase the accuracy of object recognition. Meanwhile, the object recognition apparatus needs to match the dimension of the image data and the sensor data obtained from the different type of sensor before the combination of the image data and the sensor data. For example, sensor data obtained from a motion sensor and a depth sensor may be 1D sensor data. Accordingly, the object recognition apparatus may convert the 1D sensor data into 2D sensor data for the combination of the 2D image data and the 1D sensor data.

For example, the object recognition apparatus may upsample the 1D sensor data in the form of numerical arrangement in a first axis in a second axial direction. In addition, the object recognition apparatus may set a lower weight to be applied in combination with the image data as the distance in the second axial direction increases so as to reduce the probability that an error occurs due to the 2D sensor data generated as a result of upsampling. According to another example, the weight applied in combination with the image data is a parameter of a plurality of layers constituting a learning network model generated for the conversion of the 1D sensor data into the 2D sensor data, and may be updated based on an error of a recognition result obtained as a result of comparing a category of the recognized object and an actual category of the object.

According to another example, the object recognition apparatus may obtain the 2D sensor data based on the 1D sensor data by using a previously generated learning network model for the conversion of the sensor data. This will be described later in more detail with reference to FIG. 7.

In operation S230, the object recognition apparatus may recognize the object by using the previously generated learning network model based on the 2D image data obtained from an image sensor which is one of the plurality of sensors and the 2D sensor data.

The object recognition apparatus according to an embodiment may input the 2D image data and the 2D sensor data to the previously generated learning network model as a result of training based on different types of sensor data for object recognition. The object recognition apparatus may recognize the object detected based on an output of the previously generated learning network model according to an input.

Figure 3:
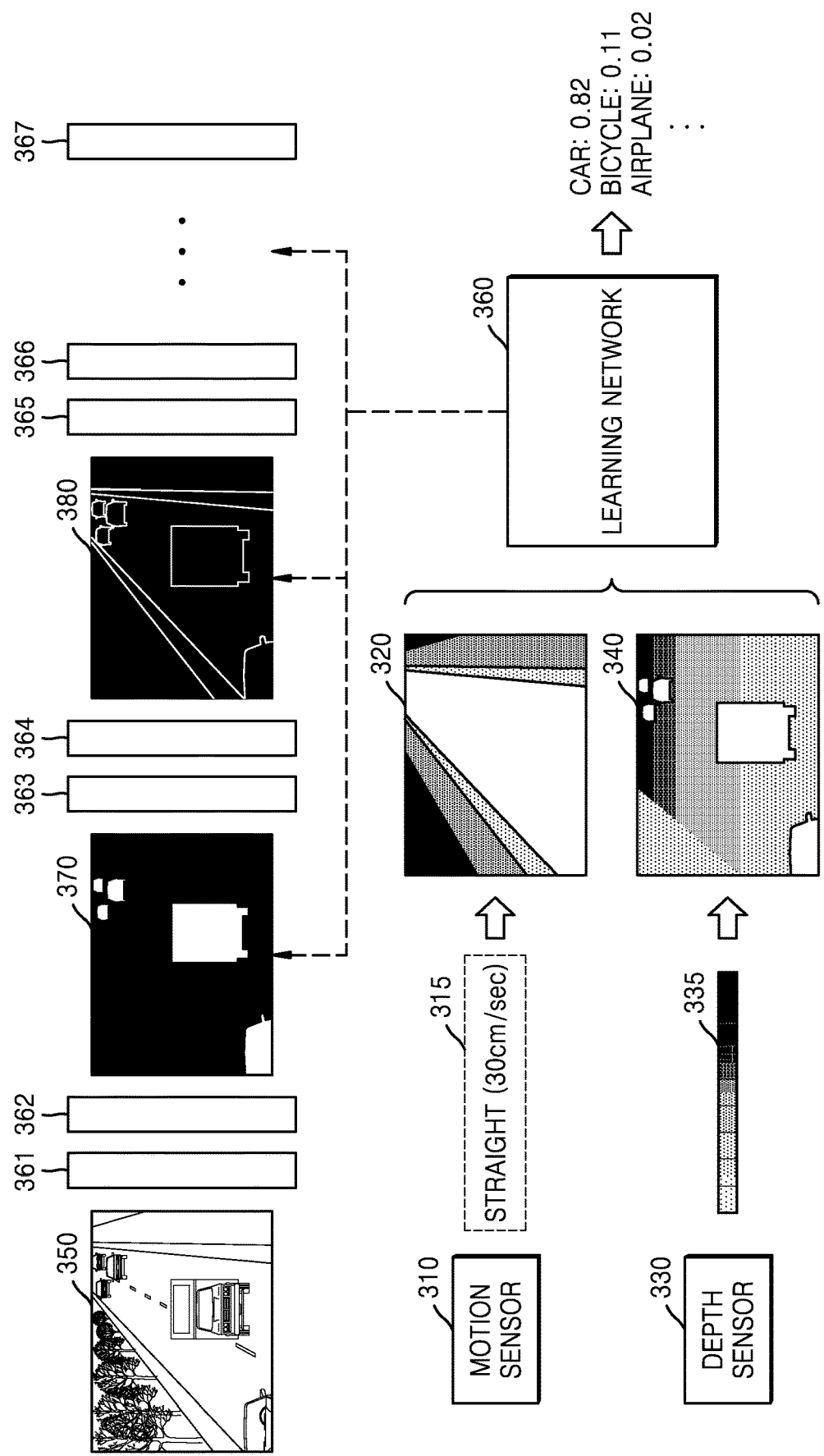
FIG. 3 is a diagram for describing a method, performed by an object recognition apparatus, of combining image data and two-dimensional (2D) converted sensor data, according to an embodiment.

FIG. 3 is a diagram for describing a method, performed by an object recognition apparatus, of combining image data and 2D converted sensor data, according to an embodiment.

Referring to FIG. 3, the object recognition apparatus may obtain sensor data 315 about a movement of an object, sensor data 335 about a distance between the object and the object recognition apparatus, and image data 350 of the object respectively from a motion sensor 310, a depth sensor 330, and an image sensor.

The object recognition apparatus may convert the sensor data 315 about the movement of the object and the sensor data 335 about the distance between the object and the object recognition apparatus into the 2D sensor data for the combination of the 2D sensor data and 2D image data 350. A method, performed by the object recognition apparatus, of converting the 1D image data into the 2D sensor data may correspond to that described above with reference to FIGS. 1 and 2.

The object recognition apparatus may input converted sensor data 320 and 340 and the image data 350 into a previously generated learning network model 360. Here, the learning network model 360 may determine which layer of a plurality of layers 361 to 367 constituting the learning network model 360 is used to combine different types of sensor data, as a result of training object recognition based on the image data and the 2D sensor data before the object recognition. In addition, the learning network model 360 may determine a result method of combining different types of sensor data based on a training result.

In FIG. 3, feature information 370 and 380 of the object obtained in each layer of the learning network model 360 is shown as a result of combining the image data and the converted sensor data. The object recognition apparatus may recognize the object as a car based on a probability value finally output from the learning network model 360.

Figure 4:
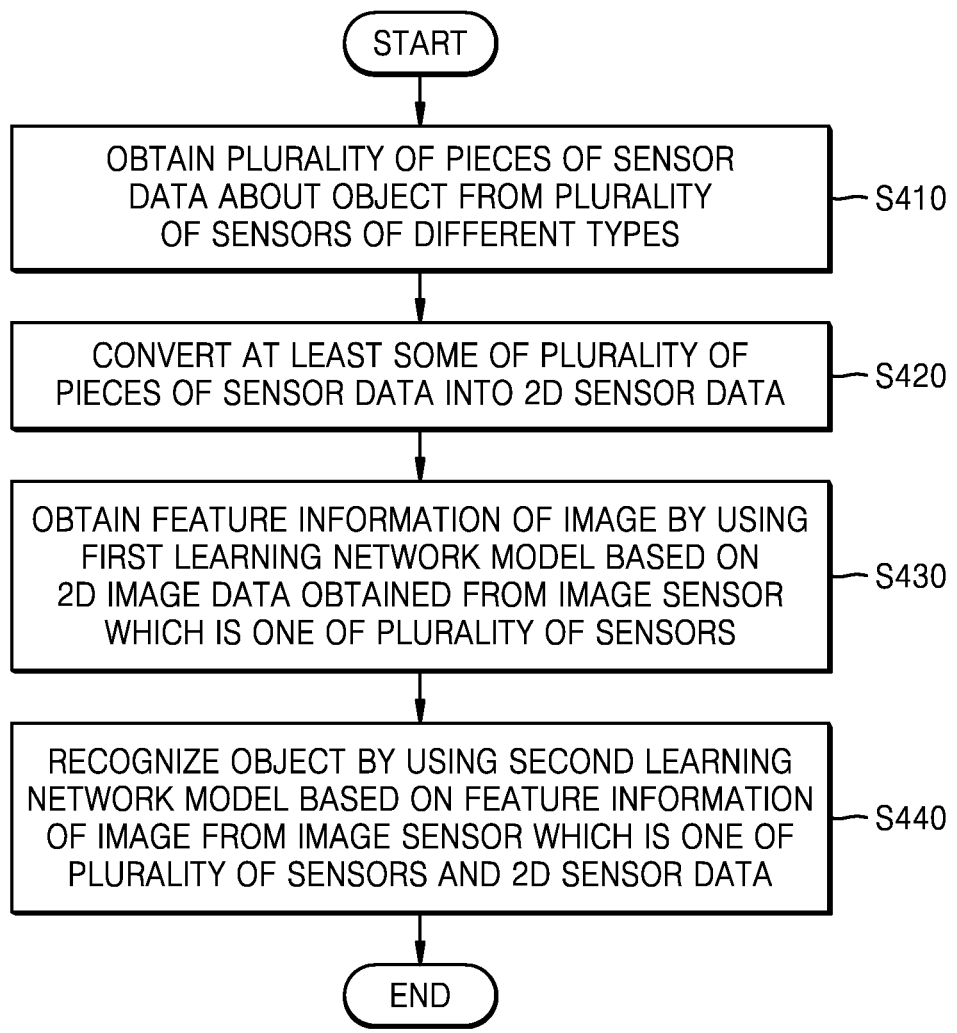
FIG. 4 is a flowchart for explaining a method, performed by an object recognition apparatus, of recognizing an object based on feature information obtained from image data by using a learning network model, according to an embodiment.

FIG. 4 is a flowchart for explaining a method, performed by an object recognition apparatus, of recognizing an object based on feature information obtained from image data by using a learning network model, according to an embodiment.

In operation S410, the object recognition apparatus may obtain a plurality of pieces of sensor data about the object from a plurality of sensors of different types.

Meanwhile, operation S410 may correspond to operation S210 described above with reference to FIG. 2.

In operation S420, the object recognition apparatus may convert at least some of the plurality of pieces of sensor data into 2D sensor data.

Meanwhile, operation S420 may correspond to operation S220 described above with reference to FIG. 2.

In operation S430, the object recognition apparatus may obtain the feature information of an image by using a first learning network model, based on the 2D image data obtained from an image sensor which is one of the plurality of sensors.

Here, the first learning network model is a previously trained network model to obtain the feature information representing the object included in the image data. The first learning network model may obtain the feature information of the image of the object based on attributes of the 2D image data. The feature information of the image may be obtained in the form of a 2D vector, but this is only an example, and the form of the feature information of the image obtained in the disclosure is not limited to the above-described example.

In operation S440, the object recognition apparatus may recognize the object using a second learning network model based on the feature information of the image from the image sensor which is one of the plurality of sensors and the 2D sensor data.

Here, the second learning network model is a previously trained network model to recognize the object by combining different types of sensor data. The object recognition apparatus may determine a type of sensor data and a combination method that increase the object recognition rate when combining the sensor data and the feature information of the image through the second learning network model. For example, when there is a conflicting value between the 2D sensor data and the image data, the object recognition apparatus may compare the accuracy of each data to select sensor data or image data having a relatively high accuracy. According to another example, the second learning network model may set a higher weight to the sensor data or the image data having the relatively high accuracy.

Figure 5:
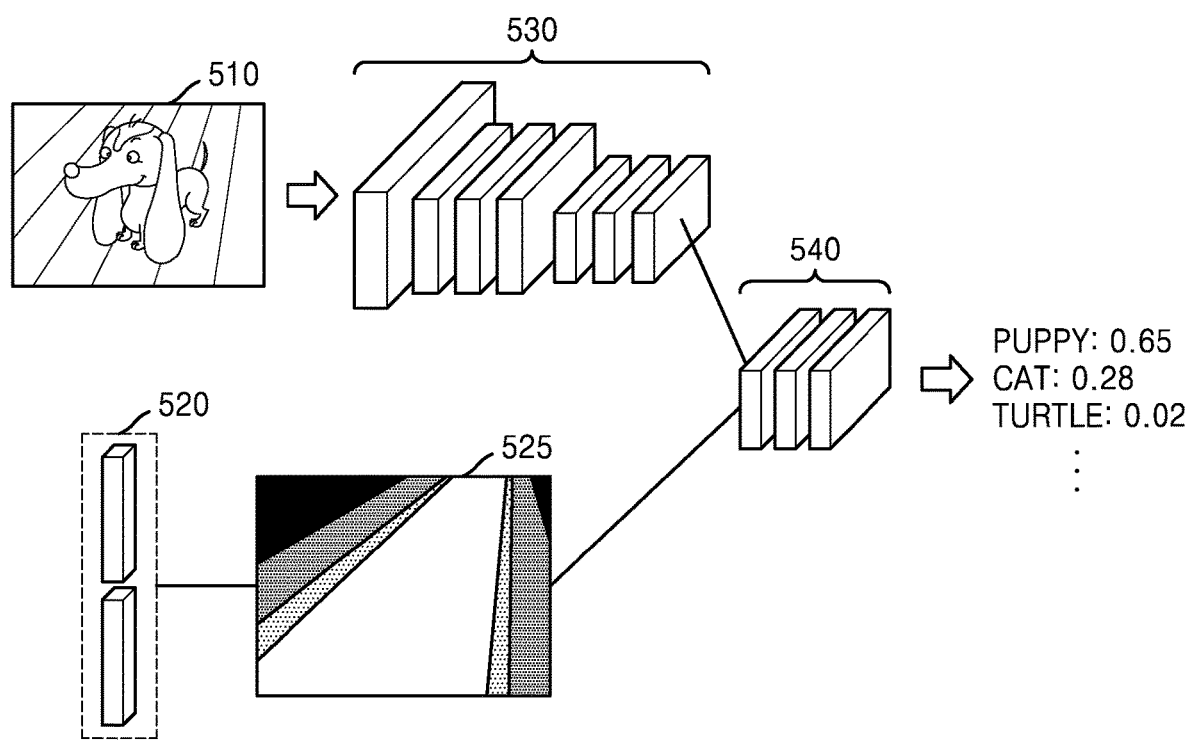
FIG. 5 is a diagram for explaining a method, performed by an object recognition apparatus, of recognizing an object based on feature information obtained from image data by using a learning network model, according to an embodiment.

FIG. 5 is a diagram for explaining a method, performed by an object recognition apparatus, of recognizing an object based on feature information obtained from image data by using a learning network model, according to an embodiment.

Referring to FIG. 5, the object recognition apparatus may obtain 2D image data 510 including the object through an image sensor. The object recognition apparatus may obtain image feature information representing the object from the image data 510, using a previously generated first learning network model 530.

The first learning network model 530 according to an embodiment may abstract various image attributes included in the image data 510 input to the first learning network model 530, thereby obtaining the image feature information representing the object included in the image data 510. Here, abstracting of the image attributes may detect the image attributes from the image data 510 and determine a core attribute that may represent the object among the detected image attributes.

In addition, the first learning network model 530 may include a plurality of layers. The image attributes included in the image data 510 may be detected and combined through each of the plurality of layers. Here, the image feature information obtained through the first learning network model 530 may be in the form of 2D.

Meanwhile, the object recognition apparatus may obtain 1D sensor data 520 from another sensor such as a motion sensor. The object recognition apparatus may convert the obtained 1D sensor data 520 into 2D sensor data 525.

The object recognition apparatus according to an embodiment may obtain an object recognition result by inputting the 2D sensor data 525 and the image feature information to a second learning network model 540. The second learning network model 540 according to an embodiment may include a plurality of layers. The second learning network model 540 may obtain feature information representing the object by abstracting various attributes included in the 2D sensor data 525 and the image feature information. The second learning network model 540 may increase the accuracy of object recognition by additionally using sensor data obtained from another sensor in addition to the image feature information for the object recognition.

Accordingly, the object recognition apparatus may identify that the object included in the image data 510 is a puppy.

Figure 6:
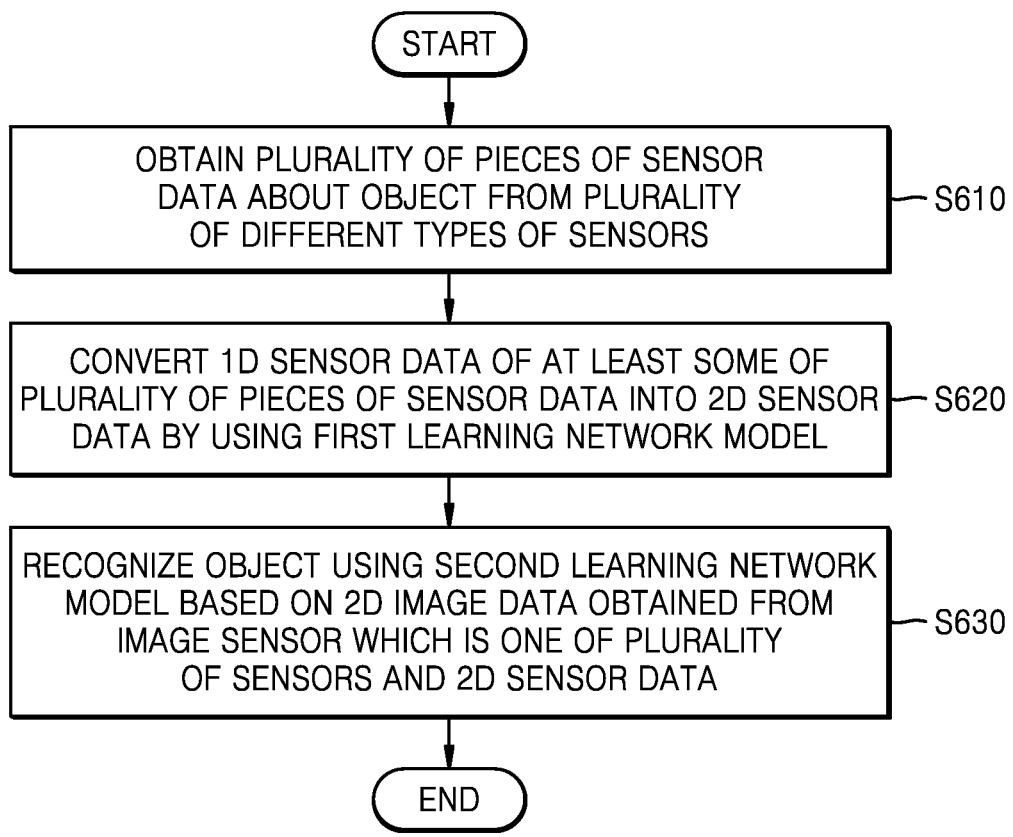
FIG. 6 is a flowchart for explaining a method, performed by an object recognition apparatus, of converting one-dimensional (1D) sensor data into 2D sensor data by using a learning network model, according to an embodiment.

FIG. 6 is a flowchart for explaining a method, performed by an object recognition apparatus, of converting 1D sensor data into 2D sensor data using a learning network model, according to an embodiment.

In operation S610, the object recognition apparatus may obtain a plurality of pieces of sensor data about an object from a plurality of different types of sensors.

Meanwhile, operation S610 may correspond to operation S210 described above with reference to FIG. 2.

In operation S620, the object recognition apparatus may convert the 1D sensor data of at least some of the plurality of pieces of sensor data into 2D sensor data by using a first learning network model.

The first learning network model according to an embodiment may be generated as a result of training based on at least one type of sensor data about at least one object obtained before object recognition.

For example, the object recognition apparatus may obtain the 2D sensor data by inputting sensor data about a motion obtained from an acceleration sensor into the first learning network model. Here, it is assumed that the input sensor data is 1D sensor data. The object recognition apparatus may evaluate training of the first learning network model by comparing a result of converting 2D sensor data into 1D sensor data again and the input 1D sensor data. The object recognition apparatus may repeatedly perform the above-described training and training evaluation process until a difference between the input 1D sensor data and the 1D sensor data reconverted from the 2D sensor data is less than a preset value.

Meanwhile, the first learning network model may be stored in an external apparatus other than the object recognition apparatus. In this case, the object recognition apparatus may request the external apparatus to convert the 1D sensor data of at least some of the plurality of sensors while transmitting the 1D sensor data to the external apparatus. Accordingly, the object recognition apparatus may obtain the 2D sensor data from the external apparatus.

In operation S630, the object recognition apparatus may recognize the object using a second learning network model based on the 2D image data obtained from the image sensor which is one of the plurality of sensors and the 2D sensor data.

Here, the second learning network model may be generated as a result of training based on different types of sensor data for the object recognition. In addition, operation S630 may correspond to operation S230 described above with reference to FIG. 2.

Figure 7:
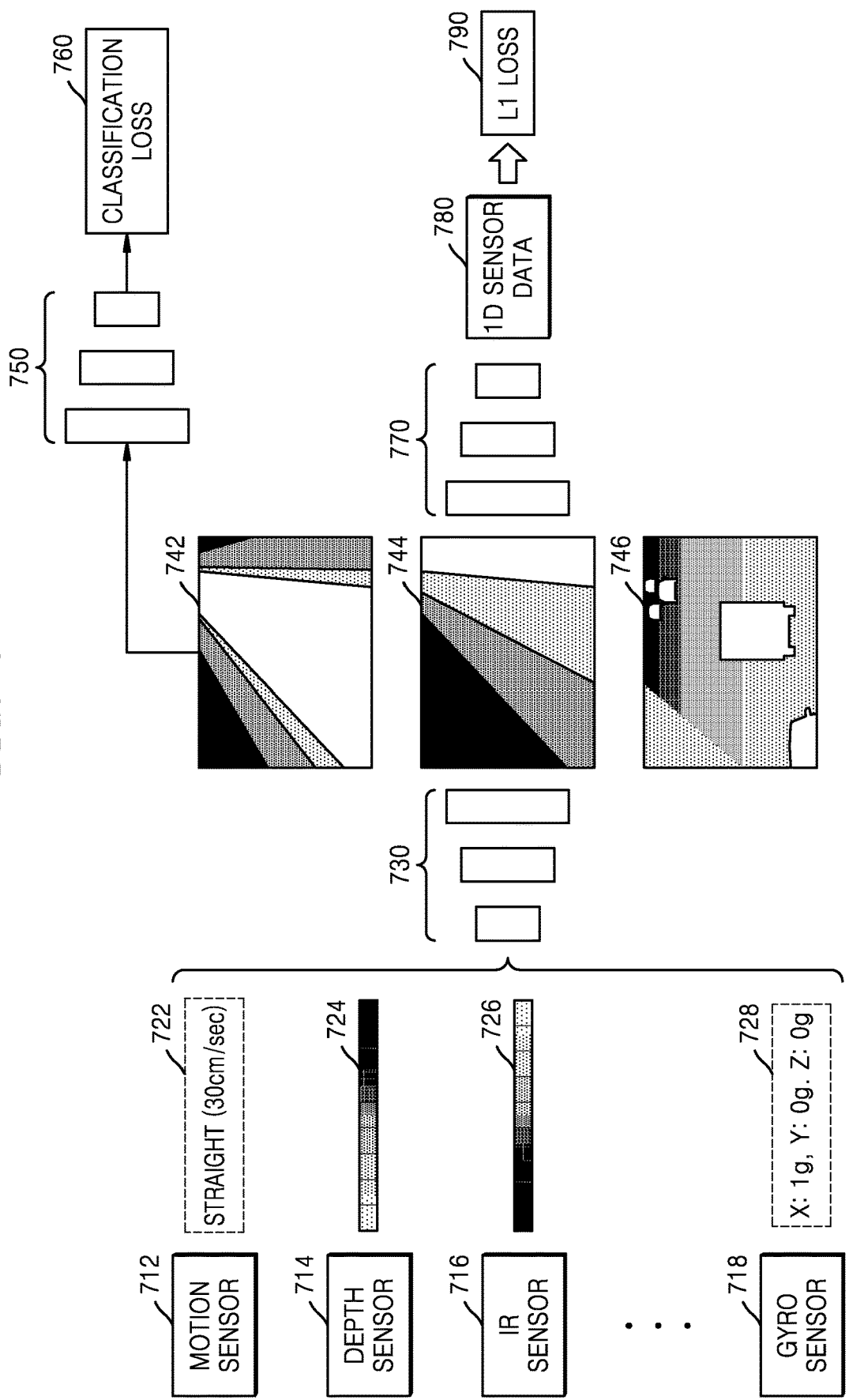
FIG. 7 is a diagram for explaining a method, performed by an object recognition apparatus, of training a learning network model that converts 1D sensor data into 2D sensor data, according to an embodiment.

FIG. 7 is a diagram for explaining a method, performed by an object recognition apparatus, of training a learning network model that converts 1D sensor data into 2D sensor data according to an embodiment.

Referring to FIG. 7, the object recognition apparatus may obtain different types of sensor data 722, 724, 726, and 728 through a plurality of sensors including an image sensor (not shown), an acceleration sensor 712, a depth sensor 714, an infrared (IR) sensor 716, a gyro sensor 718, etc.

Meanwhile, the sensor data 722, 724, 726, and 728 obtained by the sensors 712, 714, 716, and 718 except for the image sensor (not shown) may be the 1D sensor data in the form of a numerical arrangement in a first axis. The object recognition apparatus may combine 2D sensor data obtained from the image sensor with the sensor data 722, 724, 726, and 728 obtained by the sensors 712, 714, 716, and 718 to convert the 1D sensor data into the 2D sensor data so as to increase the accuracy of object recognition.

To this end, the object recognition apparatus according to an embodiment may use a previously generated first learning network model 730 for the conversion of the sensor data. Here, the first learning network model 730 may be generated as a result of training a criterion for converting the 1D sensor data into the 2D sensor data.

The object recognition apparatus according to an embodiment may obtain an error 760 (a classification loss) with respect to the object recognition by comparing an actual object with a result of recognizing an object obtained by inputting 2D sensor data 742, 744, and 746 and image data obtained from the image sensor into a previously generated second learning network model 750. When the error 760 with respect to the object recognition is within a preset range, the object recognition apparatus may determine that the training of the first learning network model 730 is successfully performed.

According to another embodiment, the object recognition apparatus may reconvert the 2D sensor data 742, 744, and 746 into 1D sensor data by inputting the 2D sensor data 742, 744, and 746 output from the first learning network model 730 into another learning network model 770 having a reverse direction structure to the first learning network model 730. For example, when the first learning network model 730 is configured as a deconvolution network, the learning network model 770 for reconversion may be configured as a convolution network having a reverse structure to the deconvolution network.

The object recognition apparatus may obtain an error 790 (L1 loss) with respect to the conversion by comparing the 1D sensor data obtained through the reconversion with the 1D sensor data input to the first learning network model 730. When the obtained error 790 is within a preset range, the object recognition apparatus may determine that training of the first learning network model 730 is successfully performed.

Figure 8:
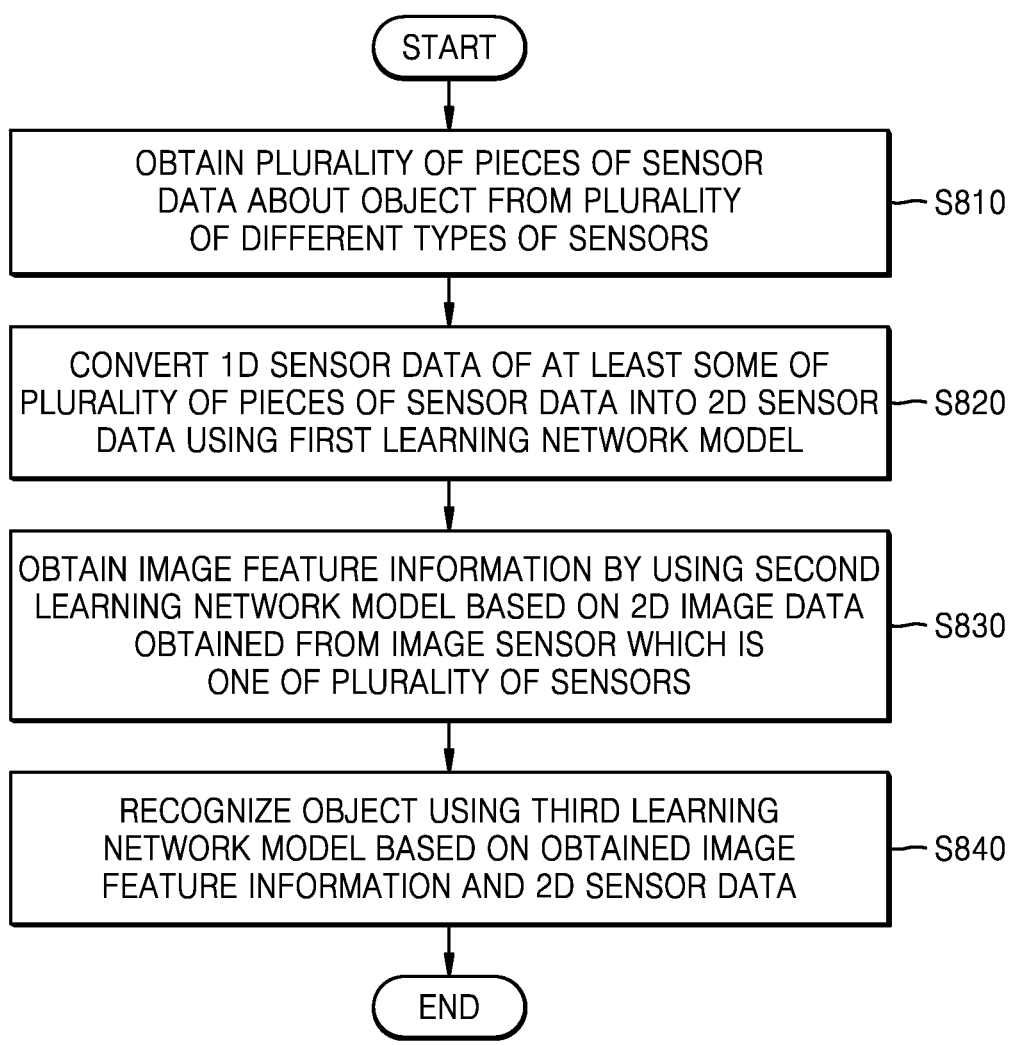
FIG. 8 is a flowchart for explaining a method, performed by an object recognition apparatus, of recognizing an object by using a plurality of learning network models, according to an embodiment.

FIG. 8 is a flowchart for explaining a method, performed by an object recognition apparatus, of recognizing an object using a plurality of learning network models, according to an embodiment.

In operation S810, the object recognition apparatus may obtain a plurality of pieces of sensor data about the object from a plurality of different types of sensors.

Meanwhile, operation S810 may correspond to operation S210 described above with reference to FIG. 2.

In operation S820, the object recognition apparatus may convert 1D sensor data of at least some of the plurality of pieces of sensor data into 2D sensor data using a first learning network model.

The object recognition apparatus according to an embodiment may convert the 1D sensor data obtained from a motion sensor and a depth sensor into the 2D sensor data by using the first learning network model generated as a result of training for the conversion of the sensor data described above with reference to FIG. 7.

In operation S830, the object recognition apparatus may obtain image feature information by using a second learning network model based on 2D image data obtained from an image sensor which is one of the plurality of sensors.

The object recognition apparatus according to an embodiment may obtain the image feature information of the object from image data by using the second learning network model trained for obtaining the image feature information described above with reference to FIG. 5.

In operation S840, the object recognition apparatus may recognize the object using a third learning network model based on the obtained image feature information and the 2D sensor data.

Here, the third learning network model may be generated as a result of training the at least one object based on sensor data obtained from different types of sensors with respect to at least one object. Meanwhile, operation S840 may correspond to operation S230 described above with reference to FIG. 2.

Figure 9:
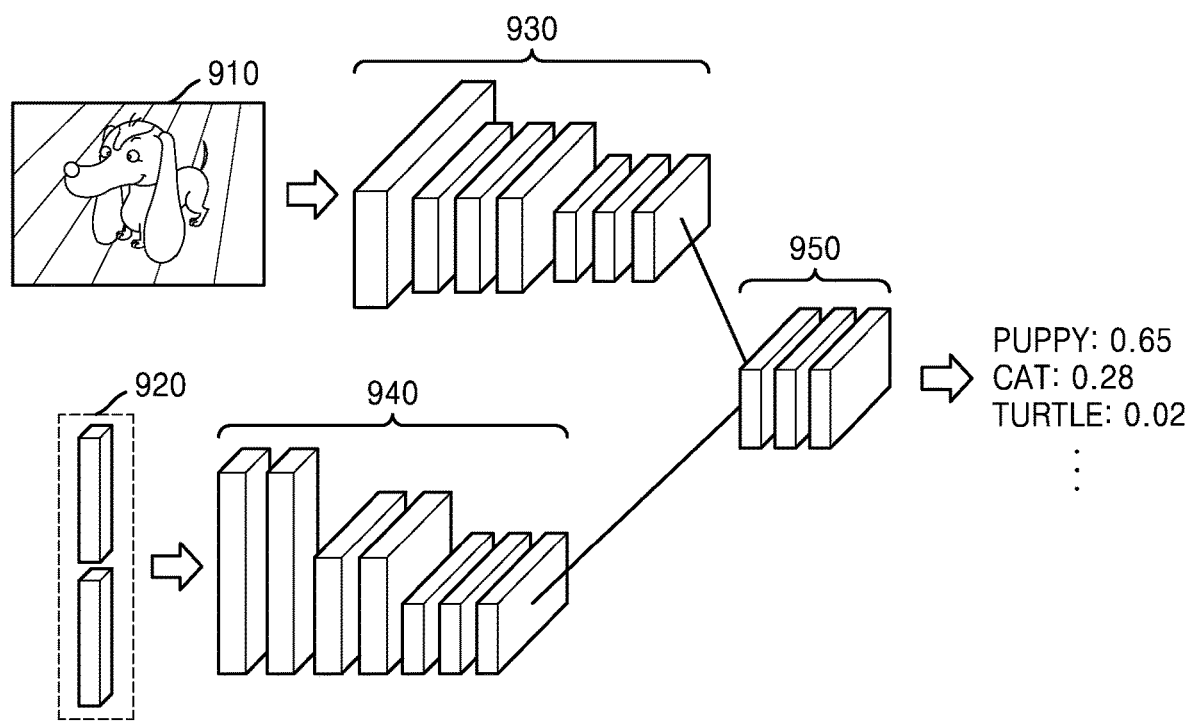
FIG. 9 is a diagram for explaining a method, performed by an object recognition apparatus, of recognizing an object by using a plurality of learning network models, according to an embodiment.

FIG. 9 is a diagram for explaining a method, performed by an object recognition apparatus, of recognizing an object using a plurality of learning network models 930, 940, and 950, according to an embodiment.

Referring to FIG. 9, the object recognition apparatus may obtain a plurality of pieces of sensor data 910 and 920 about the object by using different types of sensors included in the object recognition apparatus. For example, the object recognition apparatus may obtain the sensor data 910 about the movement of the object and the image data 910 including the object.

Meanwhile, the object recognition apparatus may match the dimensions of different types of sensor data 910 and 920 before combining different types of sensor data 910 and 920 for object recognition. Here, it is assumed that the sensor data 910 about the motion is 1D sensor data. For example, the object recognition apparatus may convert the sensor data 910 about the movement of the object into the 2D sensor data by using the first learning network model 930 generated as a result of training for the conversion of the sensor data.

In addition, the object recognition apparatus may obtain image feature information representing the object from the image data 920 using the second learning network model 940. Here, the image feature information 940 may be previously trained to output the image feature information 940 representing the object as a result of abstracting image attributes in the image data 920, using the second learning network model 940. Here, the image feature information obtained through the second learning network model 940 may be in the form of 2D.

The object recognition apparatus may recognize the object by using the third learning network model 950 based on the converted sensor data and the image feature information output from the first learning network model 930 and the second learning network model 940, respectively. The third learning network model 950 may correspond to a third learning network model described above with reference to FIG. 8.

Figure 10:
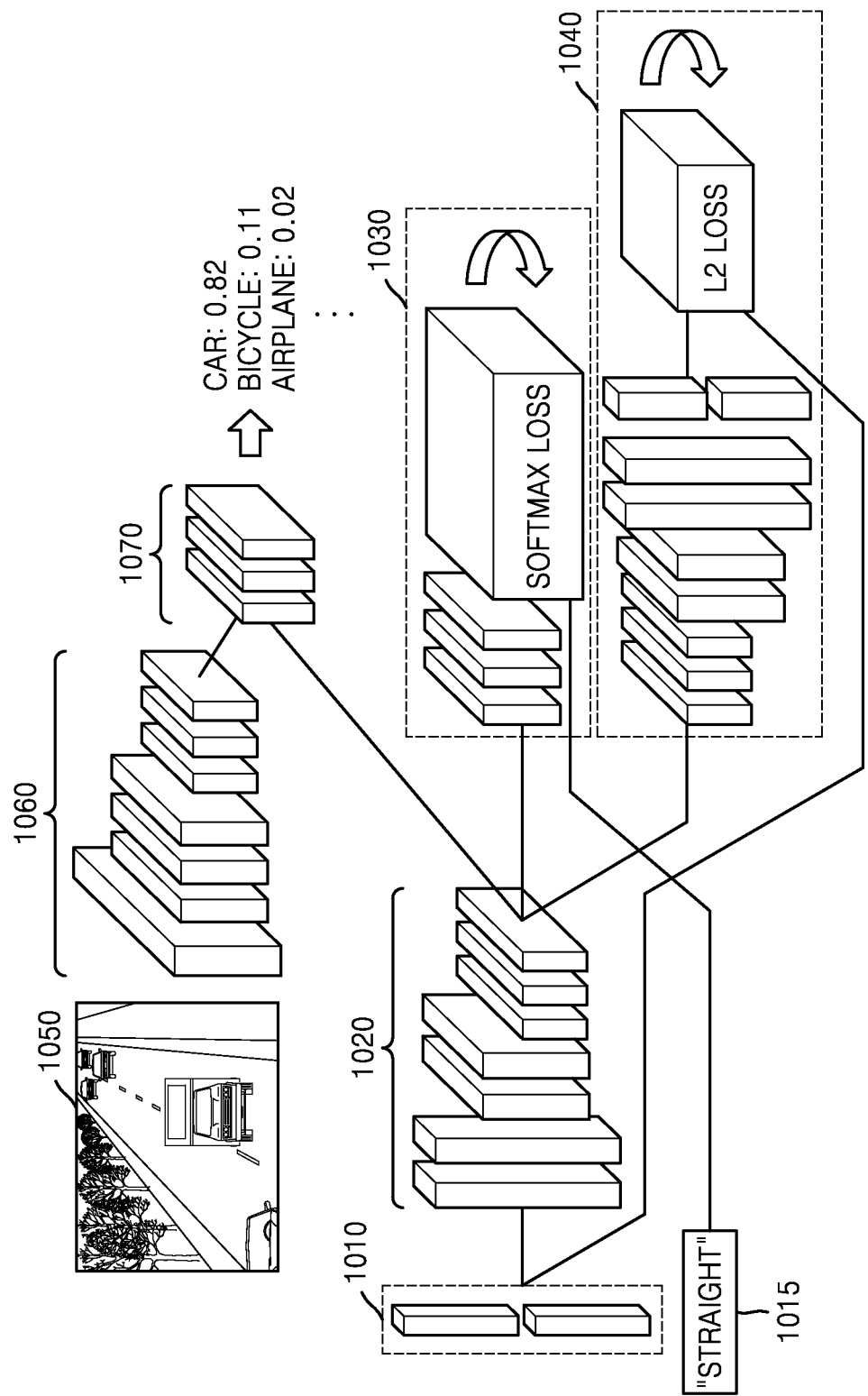
FIG. 10 is a diagram for explaining a method of training a first learning network model among a plurality of learning network models used to recognize an object, according to an embodiment.

FIG. 10 is a diagram for explaining a method of training a first learning network model 1020 among a plurality of learning network models 1020, 1060, and 1070 used to recognize an object, according to an embodiment.

Referring to FIG. 10, an object recognition apparatus may obtain 1D sensor data 1010 from a motion sensor. The object recognition apparatus may convert the 1D sensor data 1010 into 2D sensor data using the first learning network model 1020.

According to an embodiment, the object recognition apparatus may compare a class label 1015 of a sensor with respect to the 2D sensor data and the 1D sensor data 1010 to evaluate the training result of the first learning network model 1020. The object recognition apparatus may update a parameter set to each of a plurality of layers constituting the first learning network model 1020 through a first learning evaluation module 1030 that applies a back propagation algorithm according to a comparison result. For example, the object recognition apparatus may calculate, as a value, a degree to which each parameter set to the first learning network model 1020 affects an error and apply the calculated value to update the parameter set to each of the plurality of layers as a result of comparison.

Meanwhile, the object recognition apparatus may reconvert the 2D sensor data using the first learning network model 1020 into 1D sensor data by inputting the 2D sensor data output from the first learning network model 1020 into a second learning network module 1040 having a reverse direction structure to the first learning network model 1020. For example, when the first learning network model 1020 is configured as a deconvolution network, a learning network model for the second learning evaluation module 1040 may be configured as a convolution network having a reverse structure to the deconvolution network.

The object recognition apparatus may update the parameter set to each of the plurality of layers constituting the first learning network model 1020 based on a result of comparing the 1D sensor data obtained as a result of reconversion and the 1D sensor data input to the first learning network model 1020, through the second learning evaluation module 1040.

According to an object recognition apparatus according to an embodiment, based on at least one of the first learning evaluation module 1030 and the second learning evaluation module 1040, as a result of evaluating the 2D sensor data, when an error is within a preset range, may combine the 2D sensor data and image feature information. Here, the image feature information may be obtained through the second learning network model 1060 based on image data 1050 obtained from the image sensor.

The object recognition apparatus may recognize the object using the third learning network model 1070 based on the converted sensor data and the image feature information output from the first learning network model 1020 and the second learning network model 1060, respectively.

Figure 11:
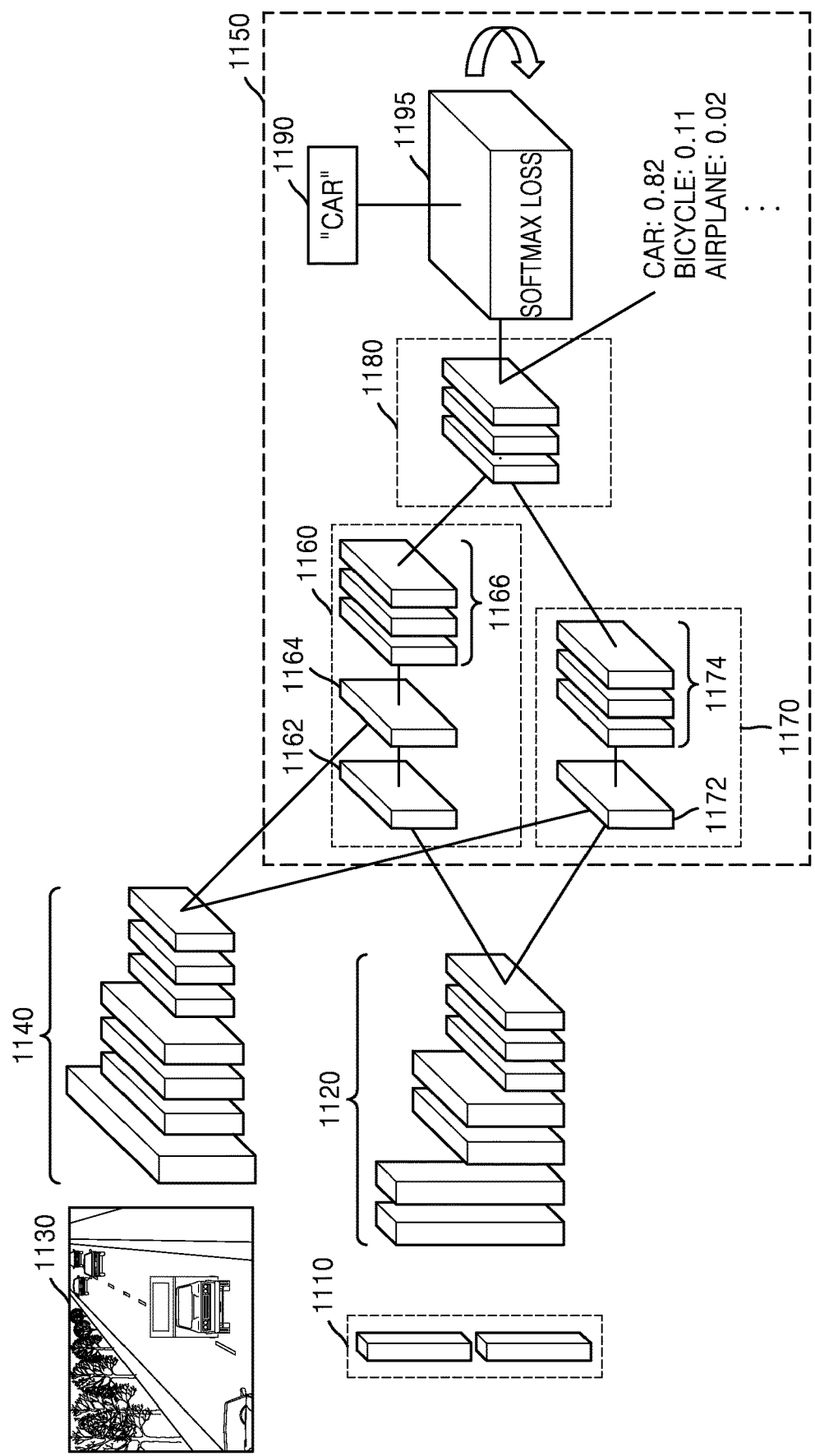
FIG. 11 is a diagram for explaining a method of training a third learning network model among a plurality of learning network models used to recognize an object, according to an embodiment.

FIG. 11 is a diagram for explaining a method of training a third learning network model 1150 among a plurality of learning network models 1120, 1140, and 1150 used to recognize an object, according to an embodiment.

Referring to FIG. 11, an object recognition apparatus may obtain 1D sensor data 1110 from a motion sensor. The object recognition apparatus may convert the 1D sensor data 1110 into 2D sensor data using the first learning network model 1120.

Also, the object recognition apparatus according to an embodiment may obtain image feature information using the second learning network model 1140 based on 2D image data 1130 obtained from an image sensor.

The object recognition apparatus may input the 2D sensor data and the image feature information obtained from the 2D image data 1050 to the combination module 1150. Here, the combination module 1150 may include the third learning network model 1150 including a plurality of layer units 1160, 1170, and 1180 and a learning evaluation module 1195. Here, the plurality of layer units 1160, 1170, and 1180 may include the first layer unit 1160, the second layer unit 1170, and the third layer unit 1180 to obtain feature information representing the object from the input image feature information and the 2D sensor data.

The first layer unit 1160 according to an embodiment may include a feature generation layer 1162, an element-wise multiplication layer 1164, and at least one convolution layer 1166.

The feature generation layer 1162 is a layer for processing feature information of the 2D sensor data, and may extract feature information that is the most effective for object recognition from the feature information of the 2D sensor data by applying a weight, etc. such that the feature information may be combined with the image feature information. In addition, the element-wise multiplication layer 1164 may combine feature information of different sensors by multiplying the feature information obtained through the feature generation layer 1162 and the image feature information for element-wise. The at least one convolution layer 1166 may obtain feature information of a type suitable for the object recognition from the feature information combined through the element-wise multiplication layer 1164. In this case, determining whether the type is suitable for the object recognition may be performed based on a result of the learning evaluation module 1195 that will be described later. However, this is only an embodiment and the first layer unit 1160 is not limited to the above-described example. According to another example, the at least one convolution layer 1166 may be configured as a rectified linear unit (ReLU) to derive a non-linear combination from the feature information of different sensors.

The second layer unit 1170 according to an embodiment may include an element-wise additional layer 1172 and at least one convolution layer 1174. The element-wise additional layer 1172 may linearly combine the 2D sensor data and image data. In addition, the at least one convolution layer 1174 may obtain the feature information of the type suitable for the object recognition from the feature information combined through the element-wise additional layer 1172. As described above, determining whether the type is suitable for the object recognition may be performed based on a result of the learning evaluation module 1195 that will be described later. In addition, at least one convolution layer 1174 may be configured as a ReLU according to another example.

The third layer unit 1180 according to an embodiment may include at least one convolution layer that obtains the feature information of the type suitable for the object recognition from the feature information obtained from each of the first layer unit 1160 and the second layer unit 1170. For example, when feature information of five and three channels is obtained from the first layer unit 1160 and the second layer unit 1170, respectively, the third layer unit 1180 may obtain the feature information of the type suitable for the object recognition from feature information of eight channels.

Meanwhile, the above-described example is only an embodiment of the third learning network model 1150, and a layer constituting the third learning network model 1150 is not limited to the above-described example.

The object recognition apparatus according to an embodiment may compare information 1190 of obtained actual object with an object recognition result. The object recognition apparatus may update a parameter (e.g. a weight) set to each of the plurality of layer units 1160, 1170, and 1180 constituting the third learning network model 1150 through the learning evaluation module 1195 that applies a back propagation algorithm according to a comparison result. For example, the object recognition apparatus may calculate, as a value, a degree to which each parameter set to the third learning network model 1150 affects an error and apply the calculated value to update the parameter set to each of the plurality of layer units 1160, 1170, and 1180 as a result of comparison.

Figure 12:
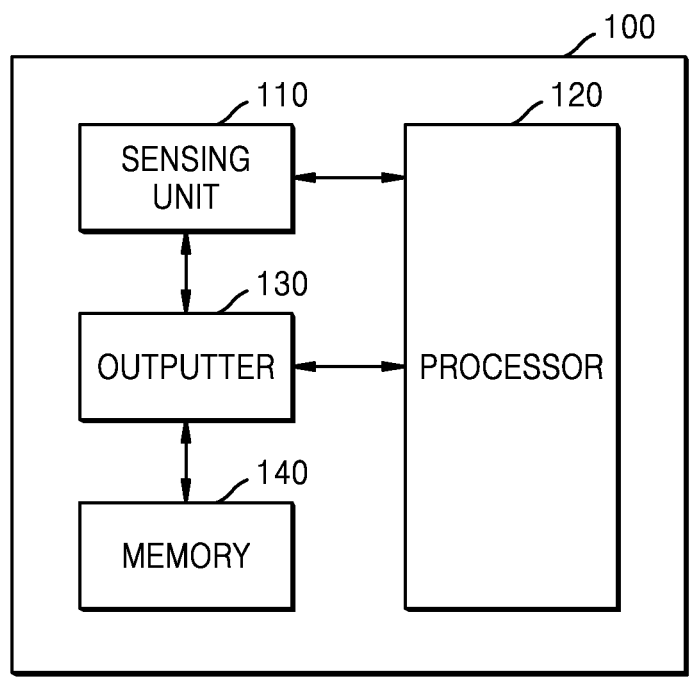
FIG. 12 is a block diagram of an object recognition apparatus for recognizing an object, according to an embodiment.

FIG. 12 is a block diagram of the object recognition apparatus 100 for recognizing an object according to an embodiment.

Referring to FIG. 12, the object recognition apparatus 100 may include a sensing unit 110, a processor 120, an outputter 130, and a memory 140.

The sensing unit 110 may detect an object located around the object recognition apparatus 100 and transmit sensor data obtained as a result of detection to the processor 120. The sensing unit 110 may include at least two or more sensors of a proximity sensor, an image sensor, a depth sensor, a pressure sensor, a magnetic sensor, an acceleration sensor, and a gyro sensor, but is not limited thereto.

The processor 120 may include one or more cores (not shown), a graphic processor (not shown), and/or a connection path (e.g., a bus, etc.) via which signals are exchanged with other elements.

According to an embodiment, the processor 120 may perform the operations of the object recognition apparatus 100, which are described above with reference to FIGS. 1 through 11.

For example, the processor 120 may obtain a plurality of pieces of sensor data about the object from a plurality of different types of sensors. In addition, the processor 120 may convert at least some of the plurality of pieces of sensor data into 2D sensor data. The processor 120 may recognize the object based on 2D image data obtained from the image sensor which is one of the plurality of sensors and the 2D sensor data, using a previously generated learning network model.

Meanwhile, the processor 120 may further include a random access memory (RAM) (not shown) and a read-only memory (ROM) (not shown) for temporarily and/or permanently storing signals (or data) processed therein. In addition, the processor 120 may be implemented as a system on chip (SOC) including at least one of a graphic processor, a RAM, and a ROM.

The outputter 130 may display information about object recognition. For example, the outputter 130 may display the sensor data obtained from the plurality of sensors. According to another example, the outputter 130 may display an object recognition result obtained from the processor 120.

The memory 140 may store programs (one or more instructions) for processing and controlling the processor 120. The programs stored in the memory 140 may be divided into a plurality of modules according to their functions. According to an embodiment, the memory 140 may be configured as a software module and a data learner and a data determiner, which will be described later with reference to FIG. 13. In addition, the data learner and the data determiner may each independently include a learning network model, or share one learning network model.

Figure 13:
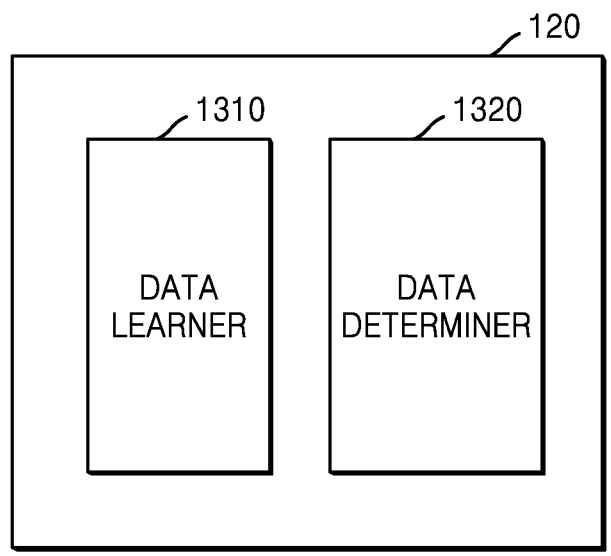
FIG. 13 is a diagram for explaining a processor according to an embodiment.

FIG. 13 is a diagram for explaining the processor 120 according to an embodiment.

Referring to FIG. 13, according to an embodiment, the processor 120 may include a data learner 1310 and a data determiner 1320.

The data learner 1310 may learn a reference for recognizing the object from image data and 2D sensor data. Also, according to another embodiment, the data learner 1310 may learn a reference for detecting image feature information from the image data. According to another embodiment, the data learner 1310 may learn a reference for converting 1D sensor data obtained from at least some of the plurality of pieces of sensor data into 2D sensor data.

The data determiner 1320 may detect feature information from the image data or convert the 1D sensor data into the 2D sensor data based on the reference trained through the data learner 1310. In addition, the data determiner 1320 may recognize the object from the image data and the 2D sensor data based on the reference trained through the data learner 1310.

At least one of the data learner 1310 or the data determiner 1320 may be manufactured in the form of at least one hardware chip and mounted on an object recognition apparatus. For example, at least one of the data learner 1310 or the data determiner 1320 may be manufactured in the form of a dedicated hardware chip for AI or may be manufactured as a part of an existing general purpose processor (e.g. a CPU or an application processor) or a graphics-only processor (e.g., a GPU) and mounted on the object recognition apparatus.

In this case, the data learner 1310 and the data determiner 1320 may be mounted on one electronic apparatus or may be mounted on separate object recognition apparatuses. For example, one of the data learner 1310 and the data determiner 1320 may be included in the object recognition apparatus, and the other may be included in a server. The data learner 1310 and the data determiner 1320 may provide model information constructed by the data learner 1310 to the data determiner 1320 by wired or wirelessly, and provide data input to the data determiner 1320 to the data learner 1310 as additional training data.

Meanwhile, at least one of the data learner 1310 or the data determiner 1320 may be implemented as a software module. When the at least one of the data learner 1310 or the data determiner 1320 is implemented as the software module (or a program module including an instruction), the software module may be stored in non-transitory computer readable media. Further, in this case, at least one software module may be provided by an operating system (OS) or by a predetermined application. Alternatively, one of the at least one software module may be provided by the OS, and the other one may be provided by the predetermined application.

Figure 14:
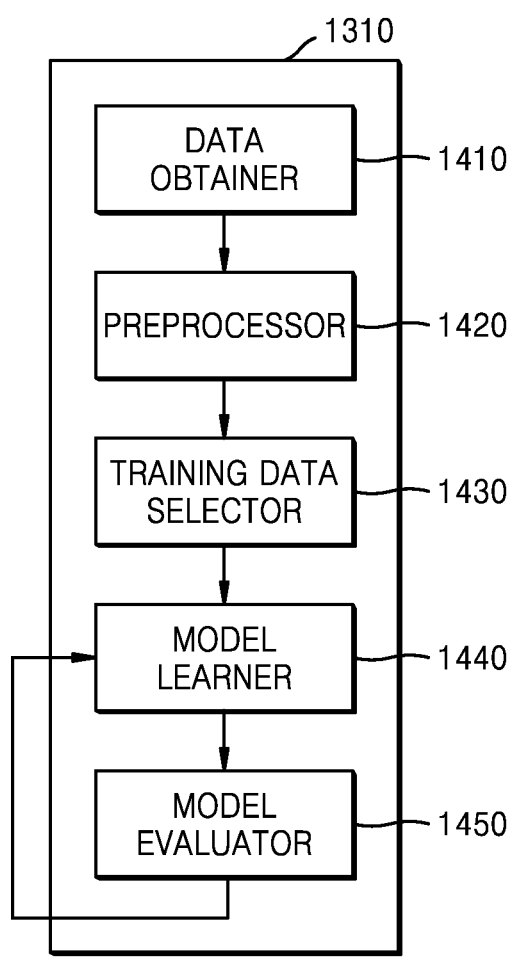
FIG. 14 is a block diagram of a data learner according to an embodiment.

FIG. 14 is a block diagram of the data learner 1310 according to an embodiment.

Referring to FIG. 14, the data learner 1310 according to an embodiment may include a data obtainer 1310, a preprocessor 1320, a training data selector 1430, a model learner 1440 and a model evaluator 1450. However, this is merely an embodiment, and the data learner 1310 may include fewer elements than the above-described elements or may further include other elements in comparison to the above-described elements.

The data obtainer 1310 may obtain a plurality of pieces of sensor data regarding at least one object obtained from different types of sensors as training data. For example, the data obtainer 1310 may obtain image data of an object, sensor data regarding the movement and position of the object, etc. as the training data.

Meanwhile, the sensor data obtained by the data obtainer 1310 may be one of sensor data classified according to the category of the object. For example, the data obtainer 1310 may perform training based on the sensor data classified according to types of objects.

The preprocessor 1320 may preprocess the obtained sensor data such that the obtained sensor data may be used for conversion of the sensor data, extraction of image feature information, or training for object recognition. The preprocessor 1320 may process the obtained at least one piece of sensor data in a predetermined format such that the model learner 1440, which will be described later, may use the obtained at least one piece of sensor data for learning.

The training data selector 1430 may select sensor data necessary for learning from the preprocessed data. The selected sensor data may be provided to the model learner 1440. The training data selector 1430 may select sensor data necessary for training from the preprocessed sensor data according to a set reference.

The model learner 1440 may learn a reference for recognizing an object by using which information of image data and 2D sensor data in a plurality of layers in a learning network model. For example, the model learner 1440 may learn a first reference about which layer among the plurality of layers included in the learning network model should be applied to recognize the object. Here, the first reference may include the type and number of image data or 2D sensor data, the type and level of a combination operation, etc. that are used by the object recognition apparatus to recognize the object.

According to various embodiments, when there are a plurality of pieces of pre-built data recognition models, the model learner 1440 may determine, as a data recognition model to learn, a data recognition model which is highly relevant to input training data and basic training data. In this case, the basic training data may be previously classified for each type of data, and the data recognition model may be pre-built for each type of data. For example, the basic training data may be previously classified based on various references such as a region where training data is generated, a time at which the training data is generated, the size of the training data, the genre of the training data, the creator of the training data, and a type of an object in the training data.

In addition, the model learner 1440 may train the learning network model for data recognition through, for example, reinforcement learning using feedback on whether the recognized object is correct according to the learning.

Further, when the learning network model is completely trained, the model learner 1440 may store the trained learning network model. In this case, the model learner 1440 may store the trained learning network model in a memory of the object recognition apparatus including the data determiner 1320. Alternatively, the model learner 1440 may store the trained learning network model in the memory of the object recognition apparatus including the data determiner 1320 that will be described later. Alternatively, the model learner 1440 may store the trained learning network model in a memory of a server connected to the object recognition apparatus over a wired or wireless network.

In this case, the memory in which the trained learning network model is stored may also store, for example, a command or data related to at least one other element of the object recognition apparatus. The memory may also store software and/or program. The program may include, for example, a kernel, middleware, an application programming interface (API), and/or an application program (or "application").

The model evaluator 1450 may input evaluation data to the learning network model, and when a recognition result output from the evaluation data does not satisfy a predetermined reference, the model evaluator 1450 may allow the model learner 1440 to be trained again. In this case, the evaluation data may be predetermined data for evaluating the learning network model. Here, the evaluation data may include a matching ratio between the category of the recognized object and the category of an actual object based on the learning network model.

Meanwhile, when there are a plurality of trained learning network models, the model evaluator 1450 may evaluate whether each of the trained learning network models satisfies the predetermined reference and determine a model satisfying the predetermined reference as a final learning network model. For example, as described above with reference to FIGS. 10 and 11, the plurality of learning network models according to an embodiment may include at least two or more learning network models among a first learning network model for converting sensor data, a second learning network model for detecting image feature information, and a third learning network model for object recognition.

Meanwhile, at least one of the data obtainer 1310, the preprocessor 1320, the training data selector 1430, the model learner 1440, or the model evaluator 1450 in the data learner 1310 may be manufactured in the form of at least one hardware chip and mounted on the object recognition apparatus. For example, the at least one of the data obtainer 1310, the preprocessor 1320, the training data selector 1430, the model learner 1440, or the model evaluator 1450 may be manufactured in the form of a dedicated hardware chip for AI or may be manufactured as a part of an existing general purpose processor (e.g. a CPU or an application processor) or a graphics-only processor (e.g., a GPU) and mounted on the object recognition apparatus.

Also, the data obtainer 1310, the preprocessor 1320, the training data selector 1430, the model learner 1440, or the model evaluator 1450 may be mounted on one object recognition apparatus or may be mounted on separate object recognition apparatuses. For example, some of the data obtainer 1310, the preprocessor 1320, the training data selector 1430, the model learner 1440, and the model evaluator 1450 may be included in the object recognition apparatus, and the others may be included in a server.

Also, at least one of the data obtainer 1310, the preprocessor 1320, the training data selector 1430, the model learner 1440, or the model evaluator 1450 may be implemented as a software module. When the at least one of the data obtainer 1310, the preprocessor 1320, the training data selector 1430, the model learner 1440, or the model evaluator 1450 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

Figure 15:
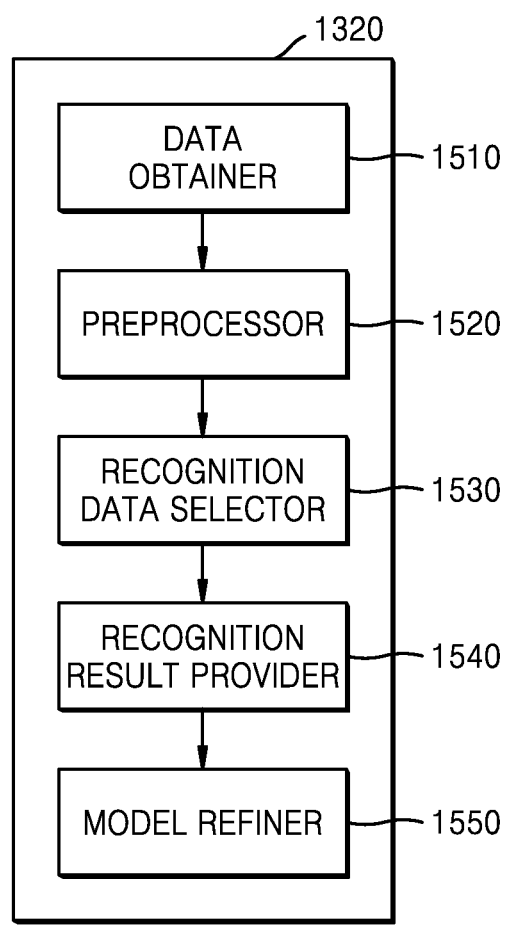
FIG. 15 is a block diagram of a data determiner according to an embodiment.

FIG. 15 is a block diagram of the data determiner 1320 according to an embodiment.

Referring to FIG. 15, the data determiner 1320 according to some embodiments may include a data obtainer 1510, a preprocessor 1520, a recognition data selector 1530, a recognition result provider 1540 and a model refiner 1550.

The data obtainer 1510 may obtain a plurality of pieces of sensor data regarding at least one object obtained from different types of sensors, and the preprocessor 1520 may preprocess the obtained sensor data such that at least one image obtained for recognition of the object may be used.

The preprocessor 1520 may process the obtain image into a preset format such that the recognition result provider 1540 which will be described later may use the obtained sensor data for object recognition. The recognition data selector 1530 may select sensor data necessary for the object recognition from among the preprocessed sensor data. The selected data may be provided to the recognition result provider 1540.

The recognition result provider 1540 may recognize the object by applying the selected sensor data to a learning network model according to an embodiment. A method of recognizing the object by applying the selected sensor data to the learning network model may correspond to the method described above with reference to FIGS. 1 to 11.

The recognition result provider 1540 may provide a result of recognizing the object based on the sensor data.

The model refiner 1550 may provide evaluation information to the model learner 1440 described above with reference to FIG. 14 such that a parameter of a classification network or at least one feature extraction layer included in the learning network model is refined based on the evaluation of the object recognition result provided by the recognition result provider 1540.

Meanwhile, at least one of the data obtainer 1510, the preprocessor 1520, the recognition data selector 1530, the recognition result provider 1540 and the model refiner 1550 in the data determiner 1320 may be manufactured in the form of at least one hardware chip and mounted on the object recognition apparatus. For example, the at least one of the data obtainer 1510, the preprocessor 1520, the recognition data selector 1530, the recognition result provider 1540 and the model refiner 1550 may be manufactured in the form of a dedicated hardware chip for AI or may be manufactured as a part of an existing general purpose processor (e.g. a CPU or an application processor) or a graphics-only processor (e.g., a GPU) and mounted on the object recognition apparatus.

Also, the data obtainer 1510, the preprocessor 1520, the recognition data selector 1530, the recognition result provider 1540 and the model refiner 1550 may be mounted on one object recognition apparatus or may be mounted on separate object recognition apparatuses. For example, some of the data obtainer 1510, the preprocessor 1520, the recognition data selector 1530, the recognition result provider 1540 and the model refiner 1550 may be included in the object recognition apparatus, and the others may be included in a server.

Also, at least one of the data obtainer 1510, the preprocessor 1520, the recognition data selector 1530, the recognition result provider 1540 and the model refiner 1550 may be implemented as a software module. When the at least one of the data obtainer 1510, the preprocessor 1520, the recognition data selector 1530, the recognition result provider 1540 and the model refiner 1550 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

FIG. 16 is a block diagram of an object recognition apparatus 1600 according to another embodiment.

Referring to FIG. 16, the object recognition apparatus 1600 according to another embodiment may include a communicator 1650, an audio/video (A/V) inputter 1660, and a user inputter 1670, in addition to a sensing unit 1610, a processor 1620, an outputter 1630, and a memory 1640 respectively corresponding to the sensing unit 110, the processor 120, the outputter 130, and the memory 140 of FIG. 12.

The sensing unit 1610 may include a magnetic sensor 1611, an acceleration sensor 1612, a temperature/humidity sensor 1613, an infrared sensor 1614, a gyroscope sensor 1615, a location sensor 1616, a pressure sensor 1617, a proximity sensor 1618, or an image sensor 1619, but this is merely an embodiment and the sensors included in the sensing unit 1610 are not limited to the above-described examples.

The processor 1620 typically controls all operations of the object recognition apparatus 1600 and a signal flow between the internal elements of the object recognition apparatus 1600 and performs a function of processing data. For example, the processor 1620 may generally control the inputter 1610, the outputter 1630, the communicator 1650, the A/V inputter 1660, and the user inputter 1670 by executing programs (one or more instructions) stored in the memory 1640.

According to an embodiment, the processor 1620 may recognize the object using at least one learning network model, based on a plurality of pieces of sensor data about the object obtained using a plurality of different types of sensors, so as to perform a function of the object recognition apparatus 100 described above with reference to FIGS. 1 to 11. The processor 1620 corresponds to the processor 120 of FIG. 12, and thus a detailed description thereof will be omitted below.

The outputter 1630 may output obtained sensor data to the sensing unit 1610. In addition, the outputter 1630 may output a result of recognizing an object determined by the processor 1620. The outputter 1630 may include a display 1631 and a sound outputter 1632.

The display 1631 may display and output information processed by the object recognition apparatus 1600. The display 1631 and a touch pad are configured as a touch screen in a layer structure, the display 1631 may be used as an input device in addition to as an output device.

The sound outputter 1632 may output audio data received from the communicator 1650 or stored in the memory 1640.

The memory 1640 may store programs (e.g., one or more instructions, a first learning network model, a second learning network model, and a third network model) necessary for processing or control operations performed by the processor 1620 or store data (e.g. an object recognition result) input to or output from the object recognition apparatus 1600.

The programs stored in the memory 1640 may be classified into a plurality of modules according to their functions, and may include, for example, a UI module 1641 and a touch screen module 1642, and the like.

The UI module 1641 may provide a specialized UI, a GUI, and the like that interact with the object recognition apparatus 1600 for each application. The touch screen module 1642 may sense a touch gesture on the user on the touch screen and may transmit information about the touch gesture to the processor 1620. The touch screen module 1642 according to an embodiment may recognize and analyze a touch code. The touch screen module 1642 may be configured as separate hardware including a controller.

The memory 1640 may include at least one type memory medium of a flash memory type, a hard disk type, a multimedia card micro type, a card type memory (e.g., SD or XD memory), RAM (Random Access Memory), SRAM (Static Random Access Memory), ROM (Read Only Memory), EEPROM (Electrically Erasable Programmable Read-Only Memory), PROM (Programmable Read-Only Memory), a magnetic memory, a magnetic disk, or an optical disk.

The communicator 1650 may include one or more elements for communicating with an external apparatus. For example, the communicator 1650 may include a short-range wireless communicator 1651, a mobile communicator 1652, and a broadcast receiver 1653.

The short-range wireless communicator 1651 may include a Bluetooth communicator, a Bluetooth low energy (BLE) communicator, a near field communicator, a WLAN communicator, a WLAN (WiFi) communicator, a Zigbee communicator, an infrared data association (IrDA) communicator, a Wi-Fi direct (WFD) communicator, an ultra wideband (UWB) communicator, an Ant+ communicator, etc., but the disclosure is not limited thereto.

The mobile communicator 1652 may transmit and receive a radio signal to and from at least one of a base station, an external terminal, or a server on a mobile communication network.

The broadcast receiver 1653 may receive a broadcast signal and/or broadcast-related information from outside through a broadcast channel. The object recognition apparatus 1600 may not include the broadcast receiver 1653 according to an embodiment.

According to an embodiment, when the learning network model is stored in an external apparatus, the communicator 1650 may request recognition of an object by transmitting sensor data to the external apparatus and receive an object recognition result from the external apparatus.

The A/V inputter 1660 is for inputting an audio signal or a video signal, and may include a camera 1661, a microphone 1662, and the like.

The camera 1661 captures an image in a camera recognition range. According to an embodiment, the image captured by the camera 166 1may be processed by the processor 1620 and displayed and output on the display 1631.

The user inputter 1670 means a means for a user to input data for controlling the object recognition apparatus 1600. For example, the user inputter 1670 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, and the like, but the disclosure is not limited thereto.

According to an embodiment, the user inputter 1670 may receive a user input that requests sensing of an object around the object recognition apparatus 1600 by using a touch pad. However, this is only an embodiment, and the user inputter 1670 may receive the user input that requests sensing of the object from a user through an input device such as a remote controller.

The configuration of the object recognition apparatus 1600 shown in FIG. 16 is merely an embodiment, and each of the elements of the object recognition apparatus 1600 may be integrated, added, or omitted according to the specification of an object recognition apparatus that is actually implemented. In other words, two or more elements may be combined into a single element, or a single element may be split into two or more elements. Functions performed by each element (or module) are intended to describe embodiments, and a specific operation or apparatus related to the functions does not limit the scope of the disclosure.

The embodiments of the disclosure may be written as programs executable on a computer, and may be implemented in general-use digital computers that execute the programs using a computer-readable recording medium.

Examples of the computer-readable recording medium include storage media such as magnetic storage media (e.g., ROM, floppy disks, hard disks, etc.), optical recording media (e.g., CD-ROMs or DVDs), and carrier waves (e.g., transmission through the Internet).

While embodiments of the disclosure have been described with reference to the figures, those of ordinary skill in the art will appreciate that the disclosure may be implemented in other specific forms without departing from the technical spirit or essential characteristics thereof. It is therefore to be understood that the above-described embodiments of the disclosure are illustrative in all aspects and not restrictive.

The invention claimed is:

1. A method of recognizing an object, the method comprising:
   obtaining sensor data about the object from a plurality of different types of sensors, one of the plurality of different types of sensors is an image sensor, wherein the obtaining of sensor data comprises obtaining two-dimensional (2D) image data from the image sensor and obtaining one-dimensional (1D) sensor data about the object from the other types sensors from among the plurality of different types of sensors;
   converting obtained 1D sensor data into 2D sensor data; and
   recognizing the object by using a previously generated learning network model based on the 2D image data and the converted 2D sensor data.

2. The method of claim 1, wherein the converting comprises:
   converting the obtained 1D sensor data into the 2D sensor data by using a learning network model, which is generated as a result of learning a reference for converting 1D sensor data into the 2D sensor data.

3. The method of claim 2, further comprising:
   obtaining the 1D sensor data by reconverting the converted 2D sensor data;
   determining an error having occurred in the conversion of the sensor data based on a result of comparing 1D sensor data which is at least part of the obtained sensor data and the 1D sensor data obtained as a result of the reconversion; and
   based on the determined error, updating a parameter of a plurality of layers constituting the learning network model for the conversion of the sensor data.

4. The method of claim 1, wherein the converting comprises:
   obtaining 1D sensor data in a first axial direction from at least one of the plurality of sensors; and
   generating the 2D sensor data by upsampling the 1D sensor data in the first axial direction in a second axial direction.

5. The method of claim 1, wherein the recognizing of the object comprises:
   obtaining image feature information representing the object from the 2D image data by using a learning network model generated as a result of learning a reference for obtaining image feature information from at least one piece of image data; and
   recognizing the object by using the previously generated learning network model based on the image feature information and the converted 2D sensor data.

6. The method of claim 1,
   wherein the previously generated learning network model comprises a plurality of layers, and
   wherein a parameter of each of the plurality of layers is determined based on a result of learning a reference for selecting at least one piece of data used for object recognition from among the image data and the converted 2D sensor data and combining the selected at least one piece of data.

7. The method of claim 1, further comprising:
   determining an error having occurred in the object recognition based on a result of comparing a category of the recognized object with a category of the object; and
   updating parameters of a plurality of layers constituting the previously generated learning network model based on the determined error.

8. A non-transitory computer-readable recording medium having recorded thereon a program for performing the method of claim 1 on a computer.

9. An apparatus for recognizing an object, the apparatus comprising:
   a memory configured to store one or more instructions;
   a display;
   a plurality of different types of sensors configured to obtain sensor data about the object, one of the plurality of sensors is an image sensor; and
   at least one processor configured to execute the one or more instructions stored in the memory to:
      obtain two-dimensional (2D) image data from the image sensor and one-dimensional (1D) sensor data about the object from the other types sensors from among the plurality of different types of sensors,
      convert obtained 1D sensor data into 2D sensor data, and
      recognize the object by using a previously generated learning network model based on the 2D image data and the converted 2D sensor data.

10. The apparatus of claim 9, wherein the at least one processor is further configured to execute the one or more instructions to:
   convert the obtained 1D sensor data into the 2D sensor data by using a learning network model, which is generated as a result of learning a reference for converting 1D sensor data into the 2D sensor data.

11. The apparatus of claim 10, wherein the at least one processor is further configured to execute the one or more instructions to:
   obtain the 1D sensor data by reconverting the converted 2D sensor data,
   determine an error having occurred in the conversion of the sensor data based on a result of comparing 1D sensor data which is at least part of the obtained sensor data and the 1D sensor data obtained as a result of the reconversion, and
   based on the determined error, update a parameter of a plurality of layers constituting the learning network model for the conversion of the sensor data.

12. The apparatus of claim 9, wherein the at least one processor is further configured to execute the one or more instructions to:
   obtain 1D sensor data in a first axial direction from at least one of the plurality of sensors, and
   generate the 2D sensor data by upsampling the 1D sensor data in the first axial direction in a second axial direction.

13. The apparatus of claim 9, wherein the at least one processor is further configured to execute the one or more instructions to:

obtain image feature information representing the object from the 2D image data by using a learning network model generated as a result of learning a reference for obtaining the image feature information from at least one piece of image data, and recognize the object by using the previously generated learning network model based on the image feature information and the converted 2D sensor data.

14. The apparatus of claim 9, wherein the previously generated learning network model comprises a plurality of layers, and wherein a parameter of each of the plurality of layers is determined based on a result of learning a reference for selecting at least one piece of data used for object recognition from among the image data and the converted 2D sensor data and combining the selected at least one piece of data.

15. The apparatus of claim 9, wherein the at least one processor is further configured to execute the one or more instructions to:

determine an error having occurred in an object recognition based on a result of comparing a category of the recognized object with a category of the object, and update parameters of a plurality of layers constituting the previously generated learning network model based on the determined error.

* * * * *